May 20, 1952      C. E. TACK      2,597,603

BRAKE COOLING BAFFLE

Filed Oct. 21, 1948      2 SHEETS—SHEET 1

INVENTOR.
Carl E. Tack

May 20, 1952

C. E. TACK 2,597,603

BRAKE COOLING BAFFLE

Filed Oct. 21, 1948

INVENTOR.
Carl E. Tack
BY
Atty

Patented May 20, 1952

2,597,603

UNITED STATES PATENT OFFICE 2,597,603

BRAKE COOLING BAFFLE

Carl E. Tack, Chicago, Ill., assignor to American Steel Foundries, Chicago, Ill., a corporation of New Jersey Application October 21, 1948, Serial No. 55,739

9 Claims. (Cl. 188—264)

This invention relates to railway brakes and more particularly to an off-wheel brake arrangement wherein brake means are provided for cooperation with substantially radial surfaces of a railway wheel and axle assembly.

It is well known in the art that radial brake surfaces such as above-described are insulated to some extent by films of air rotating therewith in what is generally known in the art as laminar air flow. Various attempts have been made in the art to disrupt the films of air rotating with the brake surfaces to increase heat dissipation therefrom. However, such efforts have been unsuccessful or unduly expensive and complicated for railway service.

A primary object of the present invention is to disrupt the films of air rotating with the radial brake surfaces in an off-wheel brake arrangement.

A more specific object of the invention is to devise an off-wheel brake arrangement wherein a centrifugal or peripheral blower type rotor having radial brake surfaces is provided with means for directing the airflow from the periphery of the rotor radially inwardly along the brake surfaces to disrupt the films of air covering the latter.

Another object of the invention is to provide means for directing airflow due to movement of the railway vehicle into hoods or shrouds adapted to direct this airflow across the radial brake surface of the rotor.

A further object of the invention is to devise a hood structure having openings or passages for brake shoes engaging the radial brake surfaces of the wheel and axle assembly.

Still another object of the invention is to provide a novel support for a hood structure such as above-described by mounting the structure on a housing supported by the truck frame and containing actuating means for the brake shoes.

The foregoing and other objects and advantages of the invention will become apparent from a consideration of the following specification and the accompanying drawings, wherein.

Figure 1:
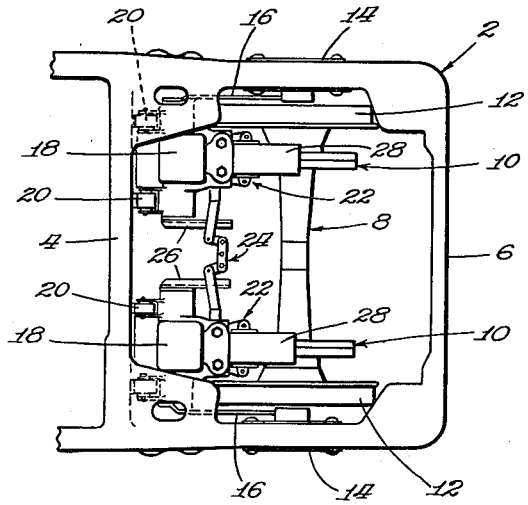
Figure 1 is a fragmentary top plan view of a railway car truck embodying the invention.

Describing the invention in detail and referring first to Figure 1 which is a fragmentary top plan view illustrating the front half of a railway car truck embodying the invention, the truck frame is generally designated 2 and comprises is transom or intermediate rail 4 and an end rail 6. The truck frame 2 is supported in conventional manner by a wheel and axle assembly 8 including spaced brake rotors 10 adjacent respective wheels 12 of the assembly which comprises journal boxes 14 outboard the wheels. The journal boxes afford support in well known manner for arms 16 connected to the outboard ends of cylinder housings 18 which are connected by brackets 20 to the transom 4.

The cylinder housings support brake mechanisms, generally designated 22, for cooperation with the associated rotors 10 and are adapted to contain actuating means (not shown) for the mechanisms 22. The housings 18 also carry hand brake actuating means 24 supported by brackets 26 mounted on the inboard ends of the housings 18. The actuating means for the brake mechanisms 22 are not disclosed in detail inasmuch as they may be of any conventional design and form no part of the present invention.

Each housing 18 supports a hood or shroud structure 28 which preferably faces the forward end of the truck, as seen in Figure 1. In this connection it may be noted that, if desired, the cylinder housings 18 and shrouds 28 at the rear end (not shown) of the truck may be mounted on the end rail 6 so that all hood structures face forwardly of the truck for a purpose hereinafter described.

However, certain advantages of the invention may be obtained by mounting all of the cylinder housings 18 on the transoms 4 of the truck despite the fact that in such an arrangement the hoods 28 at the rear end of the truck face rearwardly.

Figure 4:
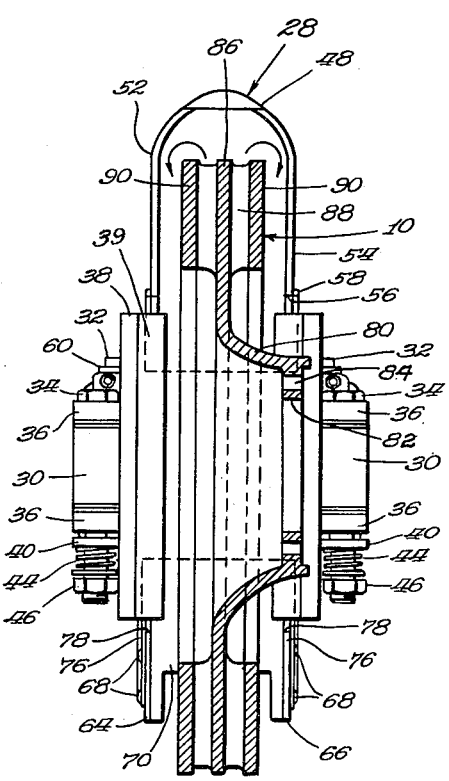
Figure 4 is an end view taken from the right of Figure 3 with the brake rotor shown in central vertical section and the supporting axle removed.
Figure 2:
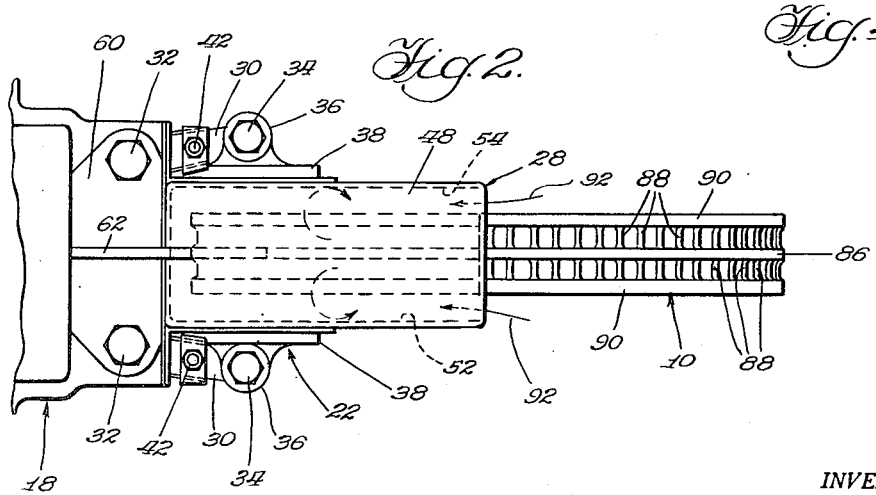
Figure 2 is an enlarged top plan view showing a portion of the truck illustrated in Figure 1.
Figure 3:
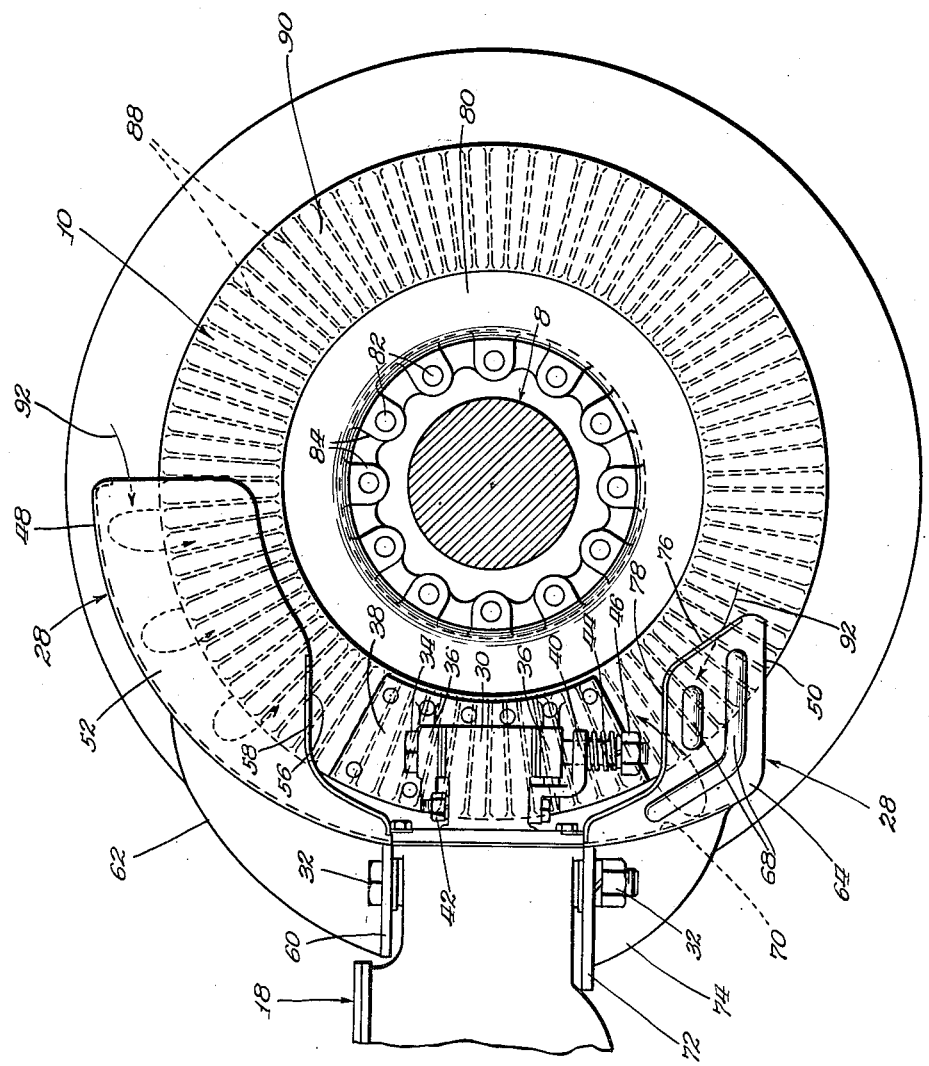
Figure 3 is a side elevational view of the structure shown in Figure 2.

Referring now to Figures 2 to 4, inclusive, it will be seen that each brake mechanism 22 comprises a pair of brake levers 30 pivotally fulcrumed by bolt and nut assemblies 32 to the supporting cylinder housing 18. Each brake lever 30 is pivotally connected by a bolt 34 to lugs 36 of a brake head 38 carrying brake shoe means 39 for cooperation with the related rotor 10.

Each brake head 38 is provided with a balancing device in the form of a bracket 40 mounted by a bolt and nut assembly 42 on the associated brake lever 30, said bracket having an opening receiving the lower end of the bolt 34 which is provided with a spring 44 bearing against the bracket and compressed by a nut 46 to develop friction between the top lug 36 and the brake lever 30, thereby yieldingly maintaining the brake head 38 in any given position thereof whereat its brake shoe means are adapted for flat face engagement with the related rotor 10.

The hood structure 28 comprises top and bottom segments 48 and 50, the top segment being generally U-shaped in end view, as best seen in Figure 4, and overlapping the upper portion of the rotor 10. Thus the top hood segment 48 comprises outboard and inboard webs or legs 52 and 54 confining the rotor 10 therebetween, the legs being cut away or recessed as at 56 (Figure 3) and being flanged as at 58 to stiffen the structure. The top hood segment 48 comprises a mounting plate 60 secured to the housing 18 by the before-mentioned bolt and nut assemblies 32 which fulcrum the brake levers 30, and the mounting plate 60 is provided with a substantially vertical reinforcing rib 62 connected to the hood segment 48 to afford rigidity.

The bottom hood segment 50 comprises outboard and inboard webs 64 and 66 reinforced by corrugations or ribs 68 and connected by a rear wall or web 70 which is provided with a mounting plate 72 secured to the housing 18 by the bolt and nut assemblies 32. The mounting plate 72 is provided with a substantially vertical reinforcing rib 74 connected to the rear web 70 of the bottom hood segment 50 and the upper edges of the webs 64 and 66 are flanged as at 76 and are cut away or recessed as at 78 (Figure 3) to define with the before-mentioned recess 56 a passage or opening through the hood structure for the brake heads 38 and their actuating levers 30.

The brake rotor 10 is a generally annular member, as best seen in the side elevational view of Figure 3, and comprises an annular hub 80 having lugs 82 on its inner perimeter and openings 84 for the reception of associated means (not shown) to secure the rotor to the related wheel 12.

The hub 80 is connected at its radially outer perimeter to a support plate 86 connected by vanes or ribs 88 to a pair of spaced substantially parallel friction plates 90 having substantially radial friction faces on their remote surfaces adapted for engagement with the brake shoe means 39.

Thus it will be understood that the brake rotor 10 during rotation of the wheel and axle assembly 8 functions as a centrifugal or peripheral blower to draw air from the radially inner perimeters of the annular friction plates 90 into the space therebetween and to impel said air radially outwardly from said space. This airflow according to the present invention is confined by the hood structure 28 and is directed across the friction faces of the rotor to disrupt the films of heat-insulating air rotating therewith.

Assuming that the hood 28 shown in Figure 3 is facing forwardly with the truck moving to the right (as shown in Figures 1 and 3) and the wheel and axle assembly and rotor 10 rotating in a clockwise direction, additional air is forced into the front end of the hood as indicated by the arrows at 92. This airflow tends to increase the turbulence of the airflow from the outer perimeter of the rotor and thus increases the effectiveness of the airflow to break up the insulating films of air rotating with the friction surface of the rotor.

It has also been found that the above-described device under railwal service conditions is effective to prevent the formation of ice on the friction surfaces of the rotor where the truck is operated under cool climatic conditions and it is believed that the above-described flow of air is effective to prevent the formation of such ice and also to increase the heat dissipation from the rotor friction surfaces, thereby increasing the service life of such brake rotors.

I claim:

1. In a brake arrangement for a railway car truck comprising a truck structure, a supporting wheel and axle assembly, a cylinder housing carried by the truck structure, brake levers fulcrumed to said housing, brake shoes carried by said levers, and a rotor connected to said assembly and disposed between said brake shoes; the combination of a hood comprising a segment carried by the housing and enclosing a portion of the periphery of said rotor above said shoes and comprising another segment supported by the housing and enclosing a portion of the periphery of said rotor below said shoes.

2. In a brake arrangement for a railway car truck comprising a truck structure, a supporting wheel and axle assembly extending transversely of the truck, and a peripheral blower type brake rotor attached to said assembly the combination of a hood structure carried by the truck structure, said hood structure enclosing a portion of the periphery of said rotor and facing an end of the truck, a passage through said hood structure dividing the same into upper and lower sections, and a brake shoe operable in said passage for braking engagement with a substantially radial surface of said rotor.

3. A brake arrangement for a truck comprising a truck frame, a supporting wheel and axle assembly having two substantially radial braking surfaces, a housing supported by the frame, and brake levers fulcrumed to the housing and carrying brake means for cooperation with said surfaces, respectively, to decelerate said assembly, characterized by a hood enclosing portions of both of said surfaces and having an entrance opening facing forwardly of said truck.

4. In a brake arrangement for a truck having a truck frame, a supporting transversely extending wheel and axle assembly with a substantially radial rotor surface, and a brake shoe adapted to engage the surface; the combination of stationary baffle means above and below said shoe at one side of said surface in vertical overlapping relationship with a portion thereof and facing forwardly of the truck for directing airflow against said surface.

5. In a brake arrangement for a truck comprising a truck structure, a supporting wheel and axle assembly, and a peripheral blower type rotor rotatable with said assembly, a plurality of stationary means vertically spaced from each other and carried by said structure for deflecting airflow from the periphery of said rotor to a radial surface thereof, and means operable between said spaced means for braking said surface, one of said spaced means being a hood U-shaped in radial cross section.

6. A cooling structure for a brake device having a rotary peripheral blower type brake rotor with radial friction surfaces on opposite sides thereof and having brake means applied to respective surfaces, said structure comprising top and bottom hoods containing and spaced from said surfaces, and a passage between said hoods aligned with respective surfaces for reception of said brake means the top hood being U-shaped in radial cross section.

7. A brake arrangement for a railway car truck comprising a truck structure, a supporting wheel and axle assembly, and brake means for developing friction against a surface of said assembly, characterized by stationary means carried by the truck structure for disrupting a film of air in the region of said surface and normally rotatable therewith, said stationary means comprising a hood, U-shaped in radial cross section, and containing a portion of said surface.

8. In a device of the class described for cooling a brake rotor in a vehicle, said rotor having oppositely facing axially spaced friction surfaces; the combination of a support adjacent said rotor, and a hood carried by said support and containing said surfaces, said hood being U-shaped in radial cross section, one end of said hood facing the direction of travel of said vehicle and the other end of said hood being closed, whereby as the vehicle travels in said direction air is forced from the hood across said surfaces.

9. In a device of the class described for cooling a brake rotor having axially spaced, oppositely facing friction surfaces; the combination of a support adjacent said rotor, and spaced hoods carried by the support and containing the rotor, said hoods having portions overlapping both surfaces radially thereof and axially spaced therefrom, and passages between said hoods, one of the hoods being substantially U-shaped in radial cross section.

CARL E. TACK.

REFERENCES CITED

The following references are of record in the file of this patent:

UNITED STATES PATENTS

| Number | Name | Date |
| --- | --- | --- |
| 1,434,770 | Bryson | Nov. 7, 1922 |
| 2,115,763 | Burke | May 3, 1938 |
| 2,165,763 | Miller | July 11, 1939 |
| 2,198,027 | Farmer | Apr. 23, 1940 |
| 2,242,855 | Flowers | May 20, 1941 |
| 2,266,059 | Milan | Dec. 16, 1941 |
| 2,284,357 | Ash | May 26, 1942 |
| 2,369,328 | Watts | Feb. 13, 1945 |
| 2,451,709 | Baselt | Oct. 19, 1948 |

FOREIGN PATENTS

| Number | Country | Date |
| --- | --- | --- |
| 541,285 | Germany | Jan. 9, 1932 |